Aug. 28, 1923.
F. M. WHITE
1,466,322
FEEDER FOR CIGAR MACHINES
Filed May 24, 1919
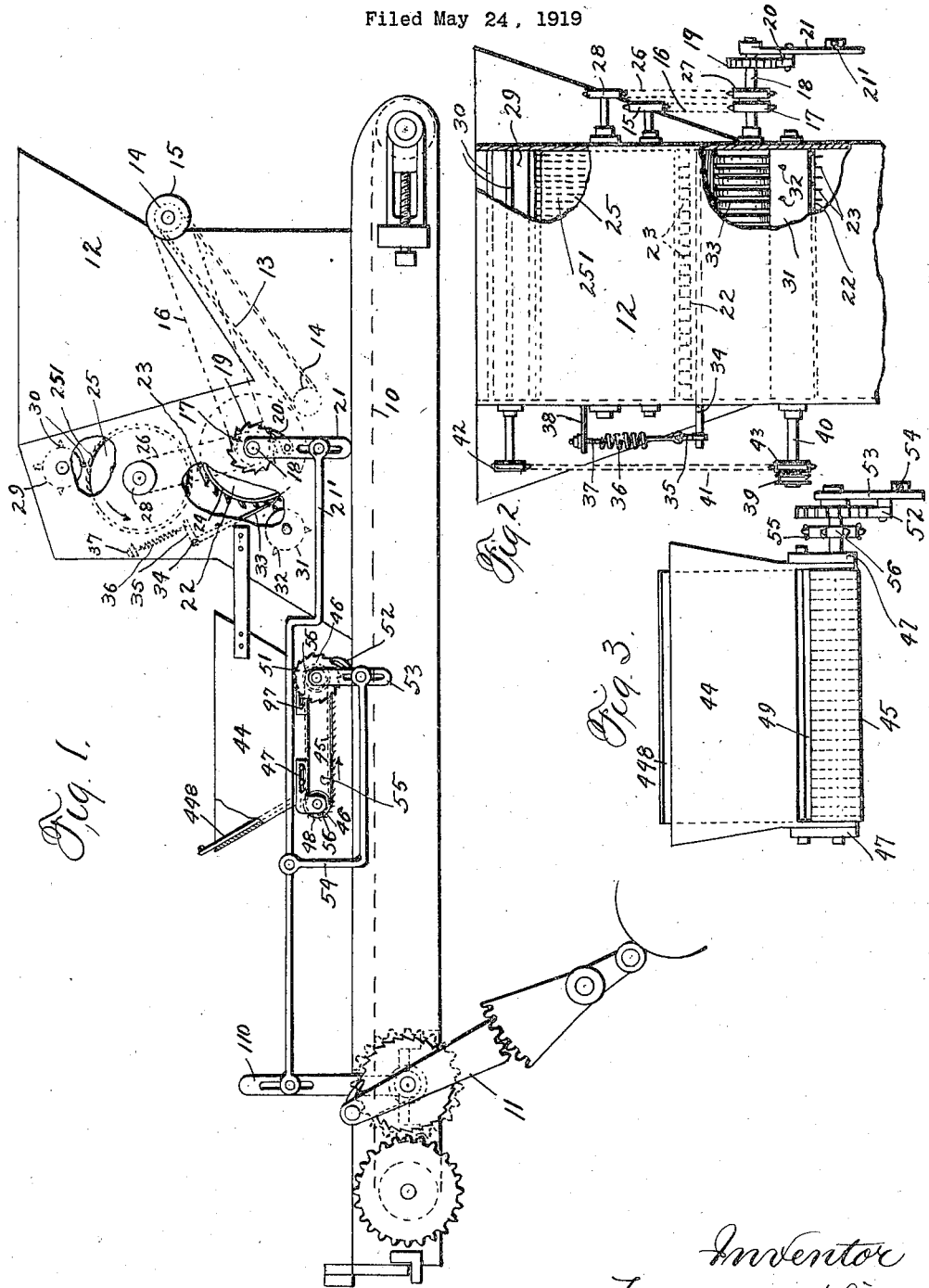

Patented Aug. 28, 1923.

1,466,322

UNITED STATES PATENT OFFICE.

FRANK MORGAN WHITE, OF HUNTINGTON, WEST VIRGINIA, ASSIGNOR, BY DIRECT AND MESNE ASSIGNMENTS, TO P. LORILLARD COMPANY, A CORPORATION OF NEW JERSEY.

FEEDER FOR CIGAR MACHINES.

Application filed May 24, 1919. Serial No. 299,493.

*To all whom it may concern:*

Be it known that I, FRANK MORGAN WHITE, a citizen of the United States, residing at Huntington, in the county of Cabell and State of West Virginia, have invented a certain new and useful Feeder for Cigar Machines, of which the following is a specification, reference being had therein to the accompanying drawings.

My invention has for its object the remedying or elimination of certain objections which characterize the hand methods of feeding the filler to machines which make little cigars or cigarettes, and which objections are costly, because of the hand labor and number of operatives required for each machine and from other reasons; variation in weight of cigars because of non-uniformity of quantity of filler supplied; impracticability of varying the proportions of long and short filler; inability to maintain the selected proportions when given proportions are fixed upon; and an unsatisfactory finished product in that the fingers of the feeder pack and knot the tobacco when it should be loose and fluffy.

The cigar machine has a leather feed belt upon which the operative deposits the filler by hand, and that belt is marked off in divisions to guide the operator in placing the quantity of filler for the desired weight of cigars. On damp days the belt stretches and increases the distance between divisions, and on hot dry days, it shrinks and shortens the distance between divisions, causing light weight cigars in the former case and heavy weight in the latter. In time, the belt becomes so stretched from use that it must be discarded, and this is expensive. A certain percentage of short filler must be used with long filler, which requires weighing, and mixing by hand before deposit on the feed belt and this cannot be properly done; and besides, an accurate pair of scales must be used for each cigar machine, and as they get out of adjustment very easily, variation in weight of the cigars is the consequence. The short filler must be placed on the feed belt so that it will work up in the cigar at the central portion thereof, or away from the cigar ends, for if it comes at the ends, as may happen with hand feeding, the cigar ends are soft or the filler falls out. In hand feeding it is not feasible to change the proportion of short to long filler, because of the necessity of changing the short filler measuring cups used in hand feeding. In hand feeding, in order to make a uniform cigar, the filler in the mixing, is pulled apart to render it fluffy, but this desired condition is spoiled by the pressure of the operative's fingers on the filler while on the belt, which packs or knots the filler.

To obviate or remedy the defects in hand feeding, above set forth, my invention consists in an automatic, or mechanical feed mechanism substantially as hereafter specified and claimed.

In the annexed drawings,

Fig. 1 is a side elevation of an automatic feeder, embodying my invention;

Fig. 2 is an end elevation of the long filler feed mechanism; and

Fig. 3 is a like view of the short filler feed mechanism.

Briefly described, my invention comprehends the use of two automatically operated sources of supply of filler, one long and the other short, that deliver to the feed belt of the cigar machine, in succession, a measured quantity of each filler, according to the proportions desired. The form and arrangement of parts forming the mechanism may be varied, and it will therefore, be understood that the particular construction and arrangement shown in the drawings and which I am about to describe in detail, is to be taken as merely illustrative, and not restrictive of my invention.

In the drawings, 10 designates the feed belt of a little cigar machine, which is intermittently moved each time a cigar is made, and which movement, in the case of the machine shown, is five-eighths of an inch, and is produced by a ratchet actuated by a swinging lever 11. Above this belt I place a hopper for long filler tobacco, and a hopper for short filler, from each of which the desired quantity of filler is periodically dropped or discharged in time with the feed belt movements so that each time a cigar is made, a quantity of filler to make a cigar is deposited on the feed belt.

The long filler hopper 12 has a downwardly inclined bottom formed by an endless belt or apron 13 of canvas, that passes over a pair of rollers 14, on the end of one of which is a sprocket wheel 15 that is connected by a chain 16 with a driving sprocket wheel 17 on a shaft 18. On the latter is a ratchet wheel 19 engaged by a feed dog 20 carried by a lever 21 pivoted to swing on the shaft 18 and connected by a link 21' with the feed belt actuating lever 11 by an arm 110. Within the hopper, and connected with the shaft 18 so as to rotate therewith, is a roller or drum 22 which reaches from side to side of the hopper and is close to the belt 13 at the lowest point of the latter. On the periphery of the drum 22 are numerous teeth 23 which may consist of double pointed tacks inserted through a leather band 24 which is fitted about the drum circumference, and the points of such teeth just clear the belt 13, as the drum revolves, their function being to take up the tobacco delivered to the drum circumference. Above the toothed drum 22 is a similar revolving toothed drum 25 whose teeth 251 are preferably finer and smaller and which travel sufficiently close to the teeth of the drum 22 as to take or comb off any excess tobacco on the drum 22 and permit only that caught by the teeth 23 thereof to remain on the drum 22. The two drums are geared to rotate together, by a sprocket chain 26ª that connects a sprocket wheel 27 on the drum shaft 18 with a sprocket wheel 28 on the shaft of drum 25. Above, and close to the drum 25 is a brush roll 29, preferably of wood, with peripheral blades 30 of leather, or other flexible material, that serve to fan or brush back into the hopper, tobacco carried by the teeth of the drum 25.

Lying close to the drum 22 and just above the feed belt 10, is a picker roll 31, with rows of teeth 32 on its periphery, which pick or strip from the adjacent drum teeth 23, the tobacco adhering to the latter, and drop it on the feed belt, and to assure a measured and exact quantity of tobacco being taken and delivered to the feed belt, I place a slotted plate or comb 33 against the periphery of the drum 22, with its fingers lying between the circular rows of teeth 23 on such drum. The comb 33 extends at an incline upward and away from the drum, and is caused yieldingly to press against the latter by placing it on a pivot 34 and attaching to a crank arm 35 one end of a coil spring 36 whose other end is attached to a tension adjusting screw 37 engaging a bracket 38 on the side wall of the hopper 12. The comb serves to hold back the tobacco so that only a measured amount reaches the teeth of the picker roll 31. The picker roll 31 is revolved at a high speed, preferably 600 R. P. M. in the machine shown, and it is belted to the driving pulley of the cigar machine, for which purpose it has a band pulley 39 on its shaft 40. The brush roll is belted to the picker roll shaft by a belt 41 that connects a pulley 42 on its shaft with a pulley 43 on the picker roll shaft.

The hopper 44 for short filler is placed in front of the long filler hopper, that is, at a point nearer the cigar machine, and for supporting the hopper 44 it may be joined to the long filler hopper by steel straps. At its bottom it has a horizontal endless band or apron 45 that runs over a pair of rollers 46, one at each end of the hopper, and both attached thereto by slotted brackets 47 bolted to the hopper sides that permit adjustment to tighten the band. Said band is similar to the clothing or covering of the upper drum 25, with its teeth 48 inclined rearward of the direction of travel through the hopper so as to prevent the tobacco clinging to the teeth. At its forward or discharge end the hopper has a slide 448 that is adjustable to vary the size of the outlet opening 49, so as to regulate the quantity of filler removed from the hopper and dropped to the feed belt 10.

The band 45 has a step by step motion in unison with the like motion of the drum 22 of the long filler feed mechanism and in unison with the motion of the feed belt 10, and this is accomplished by a ratchet wheel 51 on the shaft of one of the rollers 46, engaged by a feed dog 52 on a lever 53 connected by a link 54 with the link 21' which is connected with the ratchet lever 11 of the feed belt moving ratchet mechanism. The two rollers 46 are geared together by a sprocket chain 55 that runs over wheels 56 on the respective roller shafts. To interconnect the ratchet driving devices for the hopper feed mechanisms with the driving mechanism of feed belt 10, an arm 110 is provided, connected to move in accordance with the movement of the lever 11, and link 21 is connected to this arm 110, so that every time the feed belt is advanced one step by the oscillation of lever 11 the individual ratchet feed mechanisms are operated to deliver the predetermined amount of the respective filler materials upon the belt. To enable the amount of filler delivered to be easily regulated certain of the arms, such as arms 21, 53 and 110, are provided with slots, and the links, such as 21' and 54 are connected in the slots so that by shifting the link connections the amount of movement of arms 21 and 53 may be varied, independently or at the same time, and thus the amount of filler delivered may be regulated.

It will be seen that any percentage or proportion of long and short filler may be secured by varying the strokes of the levers 21 and 53 which determine the amount of movement of the drum 22 of the long filler mechanism and the amount of movement of the band 45 of the short filler mechanism.

Feed mechanism constructed in accordance with my invention not only obviates or remedies the defects of hand work, but such mechanism is simple, not costly to make, and requires no alteration of the cigar machine with which it is installed.

I claim:

1. The combination with the endless feed belt of a cigar machine, of a plurality of sources of supply of filler to said belt each having its own movable member for delivering filler to said belt, and means to impart periodical movement to said feed belt and simultaneously with said movement to actuate said members of said sources of supply.

2. The combination with the endless feed belt of a cigar machine, of two hoppers situated one in advance of the other along such belt, a movable member for each hopper to remove filler therefrom and deliver it to said feed belt, and a common operating means intermittently and simultaneously for moving said feed belt and said hopper members.

3. The combination with the feed belt of a cigar machine, of a plurality of sources of supply of filler to said belt, one comprising a hopper and an intermittently rotated toothed drum, and another comprising a hopper and an intermittently moved toothed band.

4. Filler feed mechanism arranged for cooperation with a small-cigar machine in which a filler feed belt is driven intermittently, step by step, said mechanism comprising a short-filler hopper and a long-filler hopper, delivery means for each hopper arranged to deliver definite amounts of the respective filler materials to the feed belt of the cigar machine, and means connected with the driving mechanism of said feed belt for operating said delivery means.

5. Filler feed mechanism arranged for cooperation with a small-cigar machine in which a filler feed belt is driven intermittently, step by step, said mechanism comprising a short-filler hopper and a long-filler hopper, delivery means for each hopper arranged to deliver definite amounts of the respective filler materials at different longitudinal points on the feed belt of the cigar machine, and means connected with the driving mechanism of said feed belt for operating said delivery means.

6. Filler feed mechanism arranged for cooperation with a small-cigar machine in which a filler feed belt is driven intermittently, step by step, said mechanism comprising a short-filler hopper and a long-filler hopper, delivery means for each hopper, the two delivery means being arranged to discharge the respective filler materials upon the feed belt, and means for operating said delivery means intermittently.

7. Filler feed mechanism arranged to cooperation with a small-cigar machine in which a filler feed belt is driven intermittently, step by step, said mechanism comprising a short-filler hopper and a long-filler hopper, delivery means for each hopper, the two delivery means being arranged to discharge the respective filler materials upon the feed belt at different longitudinal points thereof, and means for operating said delivery means in accordance with the movements of the feed belt.

8. Filler feed mechanism arranged for cooperation with a small-cigar machine in which a filler feed belt is driven intermittently by a ratchet device, said mechanism comprising a short-filler hopper and a long-filler hopper, delivery mechanism for each hopper arranged to deliver at each action a portion of the respective filler material on said feed belt, and intermittent driving means for said delivery mechanisms operatively connected with said feed-belt ratchet-drive mechanism.

9. Filler feed mechanism arranged for cooperation with a small-cigar machine in which a filler feed belt is driven intermittently by a ratchet device including an oscillating member, said mechanism comprising a short-filler hopper and a long-filler hopper, delivery mechanism for each hopper arranged to deliver at each action a portion of the respective filler material on said feed belt, and intermittent driving means for said delivery mechanisms operatively connected with said oscillating member of the feed-belt drive.

10. Filler feed mechanism arranged for cooperation with a small-cigar machine in which a filler feed belt is driven intermittently, step by step, said mechanism comprising a short-filler hopper and a long-filler hopper, delivery means for each hopper arranged to deliver definite amounts of the respective filler materials to the feed belt of the cigar machine, ratchet driving mechanism for each delivery mechanism including an oscillating member, and linkage connecting said oscillating members with the feed-belt driving means.

11. Filler feed mechanism arranged for cooperation with a small-cigar-machine in which a filler feed belt is driven intermittently by a ratchet device including an oscillating member, said mechanism comprising a short-filler hopper and a long-filler hopper, delivery mechanism for each hopper arranged to deliver at each action a portion of the respective filler material on said feed belt, ratchet driving mechanism for each delivery mechanism including an oscillating member, and linkage connecting said oscillating members with the oscillating member of said feed-belt ratchet drive.

12. Filler feed mechanism arranged for cooperation with a small-cigar machine in which a filler feed belt is driven intermittently, step by step, said mechanism comprising a short-filler hopper and a long-filler hopper, delivery means for each hopper arranged to deliver definite amounts of the respective filler materials to the feed belt of the cigar machine, ratchet driving mechanism for each delivery mechanism including an oscillating member, and linkage connecting said oscillating members with the feed-belt driving means, one of said oscillating members being provided with a slot for adjustment of the operating linkage to regulate the filler feed.

13. Filler feed mechanism arranged for cooperation with a small-cigar machine in which a filler feed belt is driven intermittently by a ratchet device including an oscillating member, said mechanism comprising a short-filler hopper and a long-filler hopper, delivery mechanism for each hopper arranged to deliver at each action a portion of the respective filler material on said feed belt, ratchet driving mechanism for each delivery mechanism including an oscillating member, and linkage connecting said oscillating member with the oscillating member of said feed-belt ratchet drive, certain of said oscillating members being provided with slots for adjustment of the operating linkage to regulate the filler feed.

14. A cigar or cigarette machine comprising a filler feed belt, means for advancing the belt intermittently step by step, a long-filler hopper and a short-filler hopper arranged substantially above the belt, filler discharge mechanism for each hopper arranged to deliver a definite amount of filler material at each action, and means connected with the feed belt operating means for actuating said delivery mechanisms intermittently in accordance with the belt movements.

In testimony whereof I affix my signature.

Mr. FRANK MORGAN WHITE.